H. E. SLOAN.
CHUCK.
APPLICATION FILED MAY 13, 1919.

1,424,597.

Patented Aug. 1, 1922.

WITNESS:

INVENTOR.
Harry E. Sloan,
BY
Arthur B. Jenkins,
ATTORNEY.

UNITED STATES PATENT OFFICE.

HARRY E. SLOAN, OF HARTFORD, CONNECTICUT.

CHUCK.

1,424,597.  Specification of Letters Patent.  Patented Aug. 1, 1922.

Application filed May 13, 1919. Serial No. 296,852.

*To all whom it may concern:*

Be it known that I, HARRY E. SLOAN, a citizen of the United States, residing in Hartford, in the county of Hartford and State of Connecticut, have invented a new and improved Chuck, of which the following is a specification.

My invention relates more especially to the class of chucks embodying jaws radially movable on its face, and an object of my invention, among others, is to provide a device of this class having means for supporting the feed screws in a particularly efficient manner.

A form of chuck embodying my invention and in the construction and use of which the objects herein set out, as well as others, may be attained, is illustrated in the accompanying drawings, in which—

Figure 1:
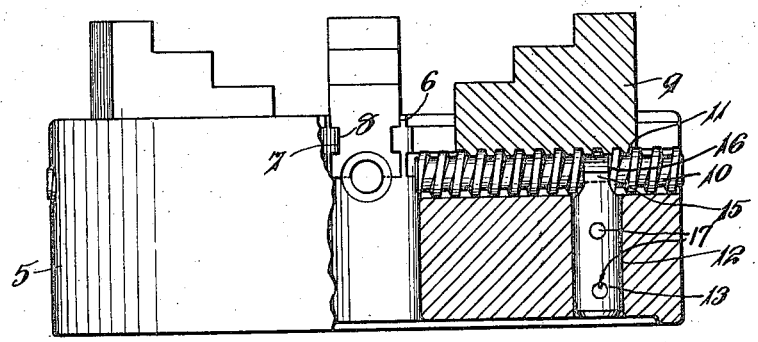
Figure 1 is a view in side elevation of a chuck embodying my invention with one side broken away in central section to illustrate construction.
Figure 2:
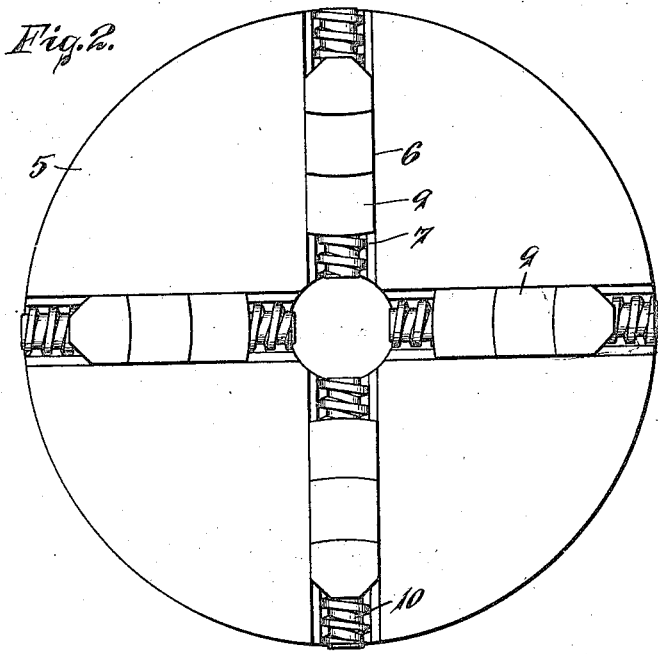
Figure 2 is a face view of the chuck illustrated in Figure 1.
Figure 3:
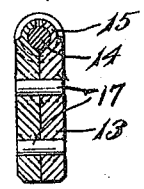
Figure 3 is a detail view in section through a feed screw support and feed screw.

In the accompanying drawings the numeral 5 denotes the body of a chuck having slots 6 radially arranged therein, said slots having guides 7, in the form of ribs that are received within guide grooves 8 in opposite sides of the jaws 9. Feed screws 10 are rotatably mounted in the chuck body 5, a feed screw being located within each slot 6, the threads of the screws meshing with racks 11 on the bottoms of the jaws 9. The parts thus far described are of old and well known construction in which the feed screws may or may not be connected for simultaneous operation, such connection when employed being well understood by those skilled in the art.

Prior to my invention various means have been employed for supporting the feed screws 10 and my invention has to do with means for supporting them in a manner to obtain advantages not present in previous devices. To this end I form holes 12 preferably extending through the chuck body from the slots 6, and of a size to receive and retain screw supports 13. These supports are made to quite closely fit the holes 12 but in a manner to permit their removal. These supports are preferably round in cross section as to the base thereof and each is divided on a plane passing centrally longitudinally through it. Each member of the support has a portion of a bearing 14 at its outer end, said bearing comprising straps 15 extending from each support and meeting at their ends, a bearing being thus formed for a feed screw 10. Each feed screw is provided with an annular groove 16 located between its ends, preferably near the center, and pins 17 may be employed to prevent relative movement of the two members of each screw support, said groove being provided by reducing the size of the feed screw as at 14.

In assembling the device the two members of a screw support are placed together to inclose a feed screw between them, an annular groove in the feed screw receiving the straps 15 that closely fit within the groove to form a bearing for said screw. The feed screw and support are then inserted from the face of the chuck body through a groove 6, the body of the support being entered into a hole 12. A jaw 9 is now inserted at the end of its groove and engaged with the threads on the feed screw that may be turned in any suitable manner (a socket in the end of the screw to receive a wrench being commonly employed) to move the jaw to place. The straps encircling the bearing portion of the screw retain the support in place and the members of the support are held together to retain the strap in engagement with the bearing portion of the screw by reason of the fit of the body portion of the support 13 in its hole 12.

In accordance with the provisions of the patent statutes, I have described the principles of operation of my invention, together with the device which I now consider to represent the best embodiment thereof; but I desire to have it understood that the device shown is only illustrative and that the invention may be carried out by other means.

I claim—

1. A chuck comprising a body having a feed screw slot opening to the face of the chuck, a jaw located on the body and projecting into said slot, and a feed screw support comprising two members engaging said screw from opposite sides, said body having a hole in the bottom of said slot in position to receive, embrace and hold in close contact the two members of said feed screw support when engaged with said feed screw.

2. A chuck comprising a body having a hole therein, a feed screw for a jaw located on the body, and a feed screw support comprising two members of substantially the same size and shape and forming a strap extending substantially around the screw, said members so fitting said hole as to be in contact with each other therein but removable from said hole.

HARRY E. SLOAN.